US010001871B2

(12) United States Patent
Sharma et al.

(10) Patent No.: US 10,001,871 B2
(45) Date of Patent: *Jun. 19, 2018

(54) MOBILE DEVICE REJECTION OF UNINTENTIONAL TOUCH SENSOR CONTACT

(71) Applicant: INTEL CORPORATION, Santa Clara, CA (US)

(72) Inventors: Sangita Sharma, Portland, OR (US); David Graumann, Portland, OR (US); Lakshman Krishnamurthy, Portland, OR (US); Jameson H. Williams, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/994,050

(22) Filed: Jan. 12, 2016

(65) Prior Publication Data
US 2016/0124571 A1 May 5, 2016

Related U.S. Application Data

(63) Continuation of application No. 13/995,459, filed as application No. PCT/US2011/054360 on Sep. 30, 2011, now Pat. No. 9,317,156.

(51) Int. Cl.
G06F 3/041 (2006.01)
G06F 3/0488 (2013.01)
(Continued)

(52) U.S. Cl.
CPC .......... *G06F 3/0416* (2013.01); *G06F 3/0488* (2013.01); *G06F 3/041* (2013.01); *G06F 3/044* (2013.01); *G06F 15/18* (2013.01)

(58) Field of Classification Search
CPC ........ G06F 3/0416; G06F 3/044; G06F 3/041; H03K 17/9622
(Continued)

(56) References Cited

U.S. PATENT DOCUMENTS 6,630,922 B2   10/2003   Fishkin et al.
7,561,146 B1   7/2009    Hotelling
(Continued)

FOREIGN PATENT DOCUMENTS

CN   101482785 A   7/2009
CN   101482785 A   7/2009
(Continued)

OTHER PUBLICATIONS

Final Office Action dated Jul. 16, 2015, in U.S. Appl. No. 13/997,160, 12 pages.
(Continued)

Primary Examiner — Fred Tzeng
(74) Attorney, Agent, or Firm — Womble Bond Dickinson (US) LLP

(57) ABSTRACT

Mobile device rejection of unintentional sensor contact. An embodiment of a mobile device includes a first touch sensor to detect contact by a user of the mobile device for input of gestures by the user, a memory to store indicators of unintentional contact to the first touch sensor, and a processor to evaluate contact to the first touch sensor. The processor compares a contact with the first touch sensor to the indicators of unintentional contact to determine if the contact is unintentional, and the mobile device rejects the contact as an input to the mobile device if the contact is determined to be unintentional and accepts the contact as an input to the mobile device if the contact is determined to be intentional.

20 Claims, 6 Drawing Sheets

(51) Int. Cl.
   *G06F 3/044*   (2006.01)
   *G06F 15/18*   (2006.01)
(58) Field of Classification Search
   USPC .......................................................... 345/173
   See application file for complete search history.

(56) References Cited

U.S. PATENT DOCUMENTS

| | | | |
|---|---|---|---|
| 8,055,305 B2 | 11/2011 | Cho et al. | |
| 2003/0043174 A1 | 3/2003 | Hinckley | |
| 2006/0044259 A1 | 3/2006 | Hotelling | |
| 2007/0152976 A1* | 7/2007 | Townsend | G06F 3/0416 345/173 |
| 2009/0225044 A1 | 9/2009 | Jeon et al. | |
| 2010/0085317 A1 | 4/2010 | Park et al. | |
| 2010/0151916 A1 | 6/2010 | Baek et al. | |
| 2010/0156795 A1* | 6/2010 | Kim | G06F 3/044 345/168 |
| 2010/0315337 A1 | 12/2010 | Ferren et al. | |
| 2010/0315356 A1 | 12/2010 | Ferren et al. | |
| 2011/0069024 A1 | 3/2011 | Kim | |
| 2011/0312349 A1 | 12/2011 | Forutanpour et al. | |
| 2012/0146929 A1* | 6/2012 | Oyama | G06F 3/0416 345/173 |
| 2012/0158629 A1 | 6/2012 | Hinckley | |
| 2012/0182238 A1 | 7/2012 | Lee | |
| 2013/0021274 A1* | 1/2013 | Fukushima | H03K 17/9622 345/173 |
| 2013/0050133 A1* | 2/2013 | Brakensiek | G06F 3/0416 345/174 |
| 2013/0069911 A1 | 3/2013 | You | |
| 2015/0346889 A1* | 12/2015 | Chen | G06F 3/0416 345/174 |

FOREIGN PATENT DOCUMENTS

| | | |
|---|---|---|
| CN | 102172097 A | 8/2011 |
| JP | 1995-036752 | 2/1995 |
| JP | 1999-039093 | 2/1999 |
| JP | 2004-77993 | 6/2004 |
| JP | 2006-146936 | 6/2006 |
| JP | 2008-052062 | 3/2008 |
| JP | 2008-511077 | 4/2008 |
| JP | 2008-532185 | 8/2008 |
| JP | 2009-169820 | 7/2009 |
| JP | 2010-026638 | 2/2010 |
| JP | 2010-213169 | 9/2010 |
| JP | 2011-100486 | 5/2011 |
| KR | 10-2007-0071917 | 7/2007 |
| KR | 10-2009-0026977 | 3/2009 |
| WO | 2011065249 A1 | 6/2011 |
| WO | WO-2011-101940 | 8/2011 |

OTHER PUBLICATIONS

International Search Report and Written Opinion of the International Searching Authority dated May 17, 2012, in International Patent Application No. PCT/US11/54360, 8 pages.
International Search Report and Written Opinion of the International Searching Authority dated Oct. 4, 2012, in International Patent Application No. PCT/US2011/068221, 9 pages.
Japanese Patent Application No. 2014-533272 Decision to Grant, dated Mar. 1, 2016, 3 pages.
Kee Eung Kim et al., "Recognition of Grip Patterns by Using Capacitive Touch Sensors," Industrial Electronics, IEEE ISIE 2006, vol. 4, Jul. 9-13. 2006, pp. 2936-2941.
Notice of Reasons for Rejection dated Feb. 24, 2015 (+ English translation), in Japanese Patent Application No. 2014-533272, 6 pages.
Notice of Reasons for Rejection dated Aug. 25, 2015 (+ English translation), in Japanese Patent Application No. 2014-533272, 6 pages.
Office Action dated Jan. 7, 2015, in U.S. Appl. No. 13/997,160, 11 pages.
Chang et al., "Recognition of Grip-Patterns by Using Capacitive Touch Sensors", IEEE International Symposium on Industrial Electronics 2006, pp. 2936-2641.
PCT International Preliminary Report on Patentability for PCT/US2011/054360 dated Apr. 1, 2014.
PCT International Preliminary Report on Patentability for PCT/US2011/068221 dated Jul. 1, 2014.
Office Action dated Mar. 11, 2015 in U.S. Appl. No. 13/995,459, 8 pages.
Final Office Action dated Jun. 26, 2015 in U.S. Appl. No. 13/995,459, 8 pages.
Office Action dated Feb. 24, 2016 in U.S. Appl. No. 13/997,160, 14 pages.

* cited by examiner

MOBILE DEVICE REJECTION OF UNINTENTIONAL TOUCH SENSOR CONTACT

CROSS-REFERENCE TO RELATED APPLICATION

This patent application is continuation application of U.S. application Ser. No. 13/995,459, filed Jun. 18, 2013, entitled MOBILE DEVICE REJECTION OF UNINTENTIONAL TOUCH SENSOR CONTACT, which is a 35 U.S.C. § 371 of International Application No. PCT/US2011/054360, filed Sep. 30, 2011, entitled MOBILE DEVICE REJECTION OF UNINTENTIONAL TOUCH SENSOR CONTACT.

TECHNICAL FIELD

Embodiments of the invention generally relate to the field of electronic devices and, more particularly, to mobile device rejection of unintentional touch sensor contact.

BACKGROUND

Mobile devices, including cellular phones, smart phones, mobile Internet devices (MIDs), handheld computers, personal digital assistants (PDAs), and other similar devices, may include one more touch sensors for operation to allow entry of inputs to the mobile device.

Such a mobile device will commonly be grasped in a hand for operation. In many circumstances, the holding of the device will be followed by an input into one or more applications or services, or reading information from the screen of the mobile device.

However, depending on the placement of touch sensors on a mobile device, the support of the device in the user's hand may inadvertently make contact a touch sensor. In this situation, a mobile device will commonly detect a touch on the touch sensor when the user of the device does not intend any action, and in fact may not be aware that touch sensor is being contacted. This can result in erroneous entries to the mobile device by the user.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
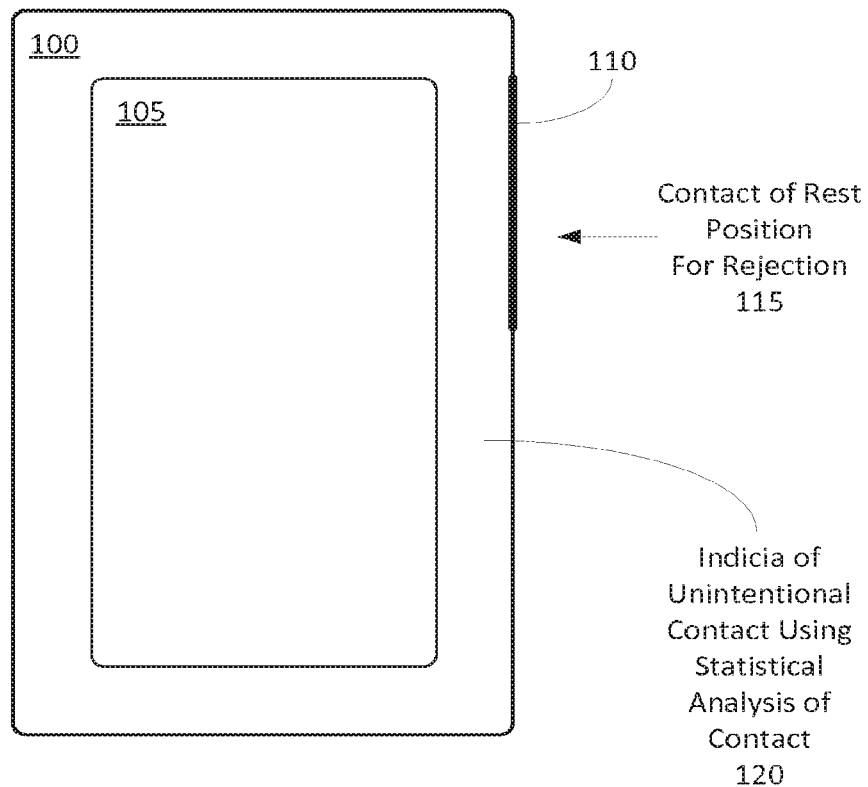
FIG. 1 illustrates an embodiment of a mobile device providing rejection of unintentional contact to touch sensors.

Embodiments of the invention are generally directed to mobile device rejection of unintentional touch sensor contact.

As used herein:

"Mobile device" means a mobile electronic device or system including a cellular phone, smart phone, mobile Internet device (MID), handheld computers, personal digital assistants (PDAs), and other similar devices.

"Touch sensor" means a sensor that is configured to provide input signals that are generated by the physical contact of a user, proximity of a user, or both (which may generally be referred to as contact with the touch sensor), including a sensor that detects contact by a thumb or other finger of a user of a device or system, including a mobile device. A touch sensor may include, but is not limited to, a capacitive sensor, which may detect the contact of a finger or hand on the capacitive sensor. A touch sensor may include a sensor used for multiple different purposes in the operation of a device or system.

"Side touch sensor" means a touch sensor that detects contact of a user, including a user's finger or hand, on at least one side of a device or system including a mobile device. A side touch sensor includes a touch sensor that is physically located at least in part on one at least one side of the mobile device, or a side touch sensor that detects contact with a user on the side of the mobile device without being physically located on the side on the mobile device.

When using a mobile device having a touch sensor on the side, at times the user might unintentionally interact with the sensor. For example, when the user is supporting the device on the user's palm to simply read information on the touch screen, or to interact with the touch screen using the thumb of the hand supporting the device. In cases such as this, the palm of the user's hand can, for example, easily wrap around the lower end of the touch sensor, causing it to appear as a touch on the side touch sensor.

In another example, a user may simply rest the user's thumb on the sensor, or the index finger on the edge of the sensor, to support the device, such as while reading from the screen. This type of unintentional contact with a touch sensor may become more frequent if the touch sensor is longer in length on the side of the mobile device. In this case, the sensor might register an unintentional interaction in a lower part of the touch sensor while the user is intentionally interacting with an upper part of the sensor.

If not addressed, these unintentional interactions may become issues in at least two scenarios. In a first scenario, a user is actively trying to interact with the touch screen of a mobile device. In this case, the detected unintentional touch sensor motion may conflict with the touch screen motion, and may result in the system, for example, randomly responding to either of the two inputs or generating an error condition, thereby creating a disruption of the user experience with the mobile device.

In a second scenario, in which a mobile device utilizes a longer touch sensor, there may be both an intentional contact on an upper portion of the sensor and an unintentional contact with lower portion of the sensor. In operation, either of the multiple touches to the touch sensor (one of which is intentional and one of which is unintentional) may randomly be triggered, again causing disruption of the experience of the user with the mobile device.

In some embodiments, a mobile device provides for rejection of unintentional touch sensor contact. In some embodiments, a mobile device addresses the described issue of unintentional contact of a side touch sensor by identifying the user intent, and masking off the unintentional interactions with the touch sensor.

In some embodiments, an apparatus, system, or method provides for analyzing the shape and movement characteristics of a resting finger/palm of a user in order to filter out these signals, and thereby avoid unintentional gestures. In some embodiments, an approach includes analyzing different long term statistics of the features extracted from the relevant sensor readings during an interaction. If the long term statistics suggest that the interaction is stationary (and thus unintentional), the interaction is suppressed. In this way, conflict with any intentional user interaction, such as the touch screen interaction or a valid finger interaction on a long sensor, is prevented.

FIG. 1 illustrates an embodiment of a mobile device providing rejection of unintentional contact to touch sensors. In some embodiments, a mobile device 100 provides for rejection of resting positions of fingers and hands on touch sensors. In some embodiments, the mobile device 100 includes a screen 105 for viewing displayed information, which may include a touch screen that provides both for presenting data and images to a user and for receiving input from the user. In some embodiments, the mobile device 100 further includes a side touch sensor 110 for the receipt of inputs from a user in the form of gestures from a user's thumb or other finger.

In some embodiments, the mobile device 100 provides for rejection of resting positions of fingers or hands of users 115 on the side touch sensor. In some embodiments, the mobile device includes indicia of unintentional contact for the mobile device 120, which may be stored in non-volatile memory, where the mobile device uses statistical analysis of the contact on the touch sensor 110 to determine whether contact should be rejection an unintentional contact on the touch sensor.

In some embodiments, the touch sensor 110 may include capacitive sensors and may also include other sensors, such as an optical sensor. See, for example, U.S. patent application Ser. No. 12/650,582, filed Dec. 31, 2009 (Optical Capacitive Thumb Control with Pressure Sensor); U.S. patent application Ser. No. 12/646,220, filed Dec. 23, 2009 (Contoured Thumb Touch Sensor Apparatus).

Figure 2:
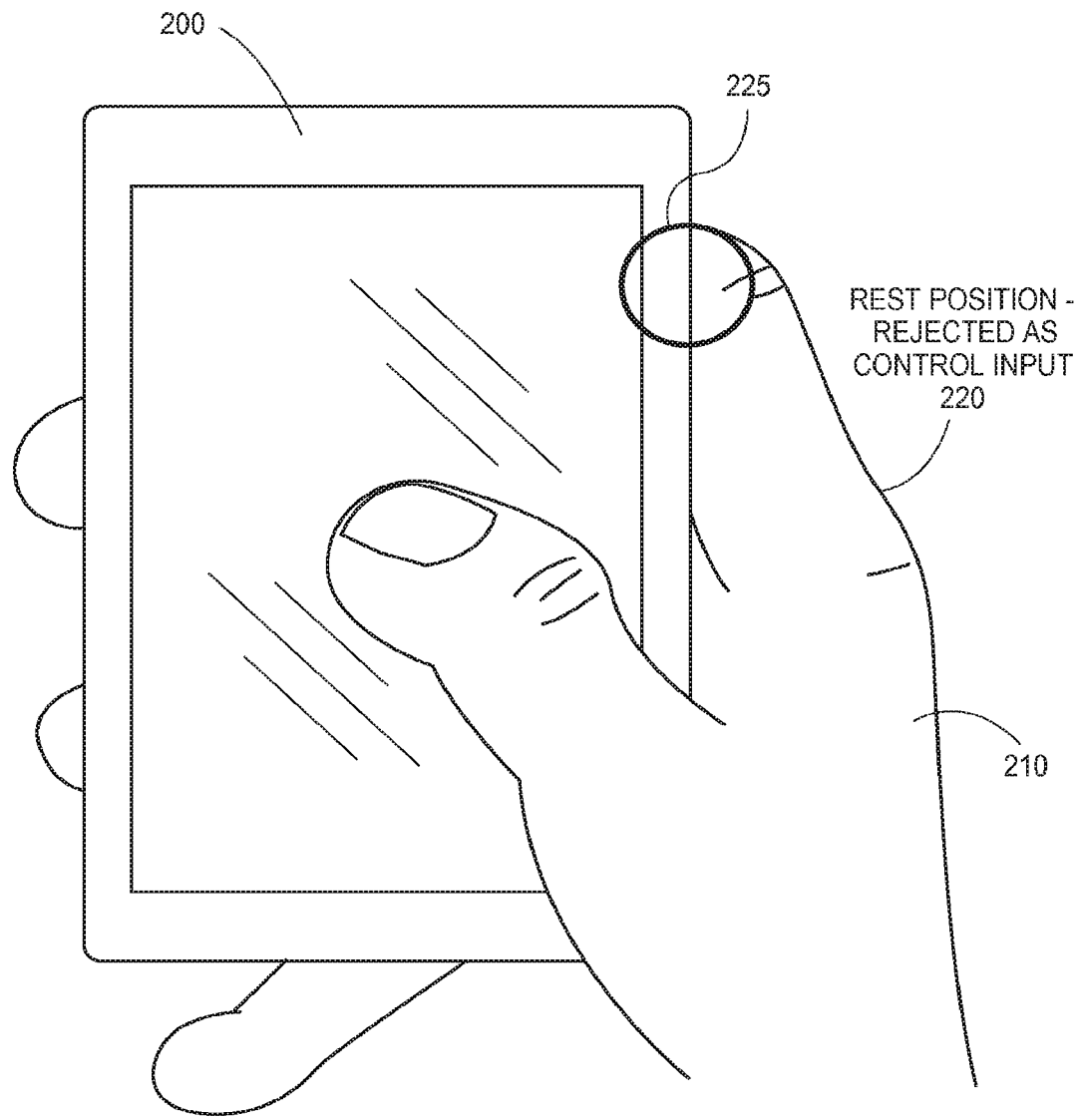
FIG. 2 illustrates rejection of rest position contact by an embodiment of a mobile device.

FIG. 2 illustrates rejection of rest position contact by an embodiment of a mobile device. In some embodiments, a mobile device 200 includes a side touch sensor (obscured in this diagram). In operation the hand 210 of a user of the mobile device 200 may inadvertently contact the side touch sensor when the hand is in a rest position 220 to support the mobile device 200.

In some embodiments, the mobile device provides for rejection of the contact based on statistical analysis of the contact over a time period. For example, in this illustration the contact point 225 is a large area on the side touch sensor, and the contact will tend to be generally non-moving. In some embodiments, statistical analysis of these and related factors are used to determine the contact is inadvertent and to reject signals from this contact of the side touch sensor.

Figure 3:
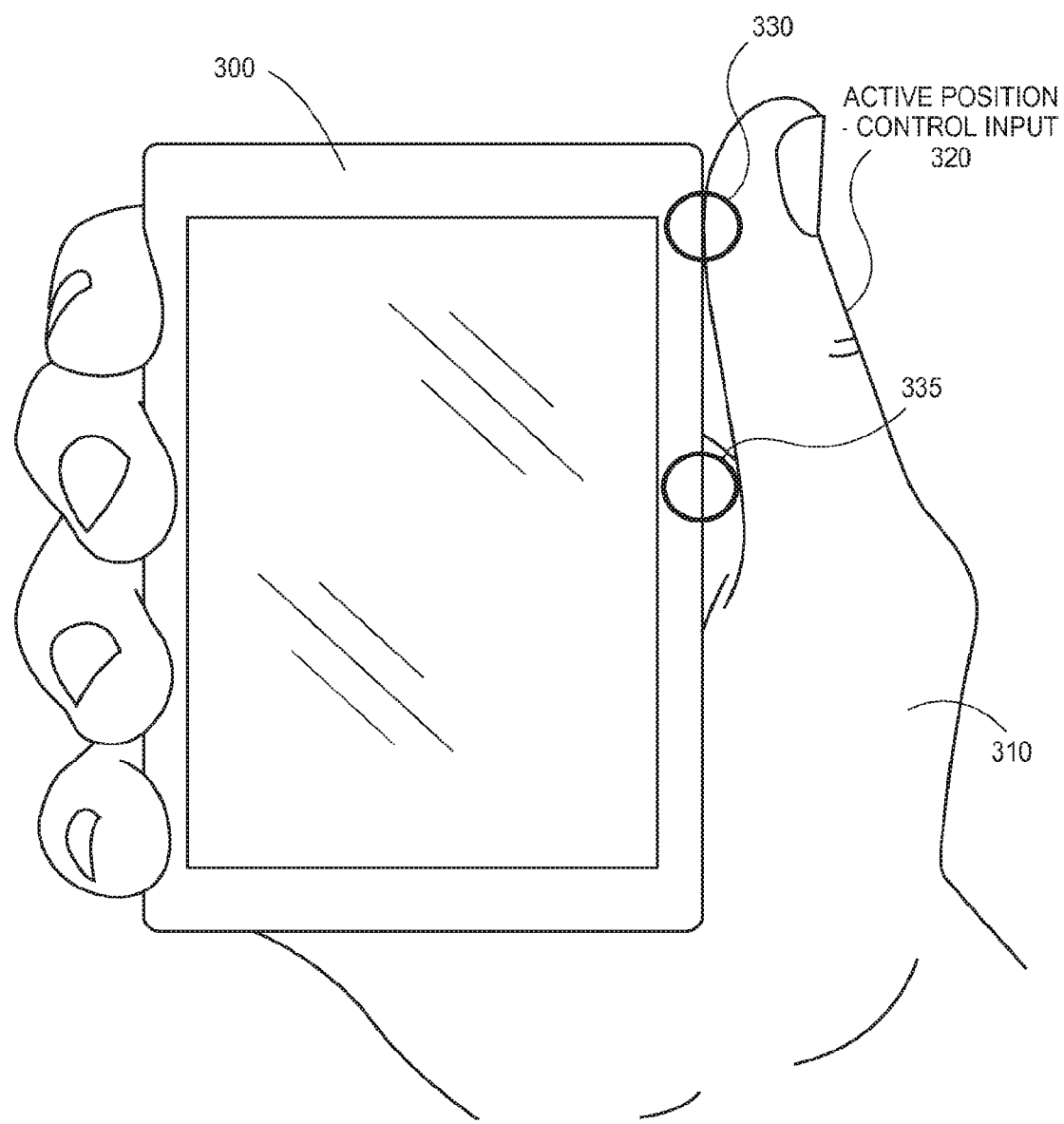
FIG. 3 illustrates rejection of incidental contact as input by an embodiment of a mobile device.

FIG. 3 illustrates rejection of incidental contact as input by an embodiment of a mobile device. In some embodiments, a mobile device 300 includes a side touch sensor (obscured in this diagram). In this example, the side touch sensor may be long enough in length that it is possible for there to be inadvertent contact on the bottom of the side touch sensor. In operation the hand 310 of a user of the mobile device 300 may contact the side touch sensor at multiple locations when the hand is in an active position for control input 320. In this illustration, the thumb of the user is contacting the side touch sensor at a first point 330 to provide input to the mobile device 300. However, the hand of the user may also contact the side touch sensor at a second point 335 because of the length of the side touch sensor, the particular size of the user's hand, and the particular manner in which the mobile device 300 is being held in the user's hand. In this circumstance, the second contact 335 may be constant, but also may occur on and off as the user changes the first contact point 330 to provide input to the mobile device 300.

In some embodiments, the mobile device provides for rejection of the second contact point 335 based on statistical analysis of the contact over a time period. For example, in this illustration the second contact point 335 is located in a lower area of the side touch sensor, and is in addition to the first contact point 330. In some embodiments, statistical analysis, including knowledge that there are two contact points and that the second contact point remains at the lower end of the side touch sensor, is used to determine the second contact 335 is inadvertent and to reject signals from this contact of the side touch sensor.

Figure 4:
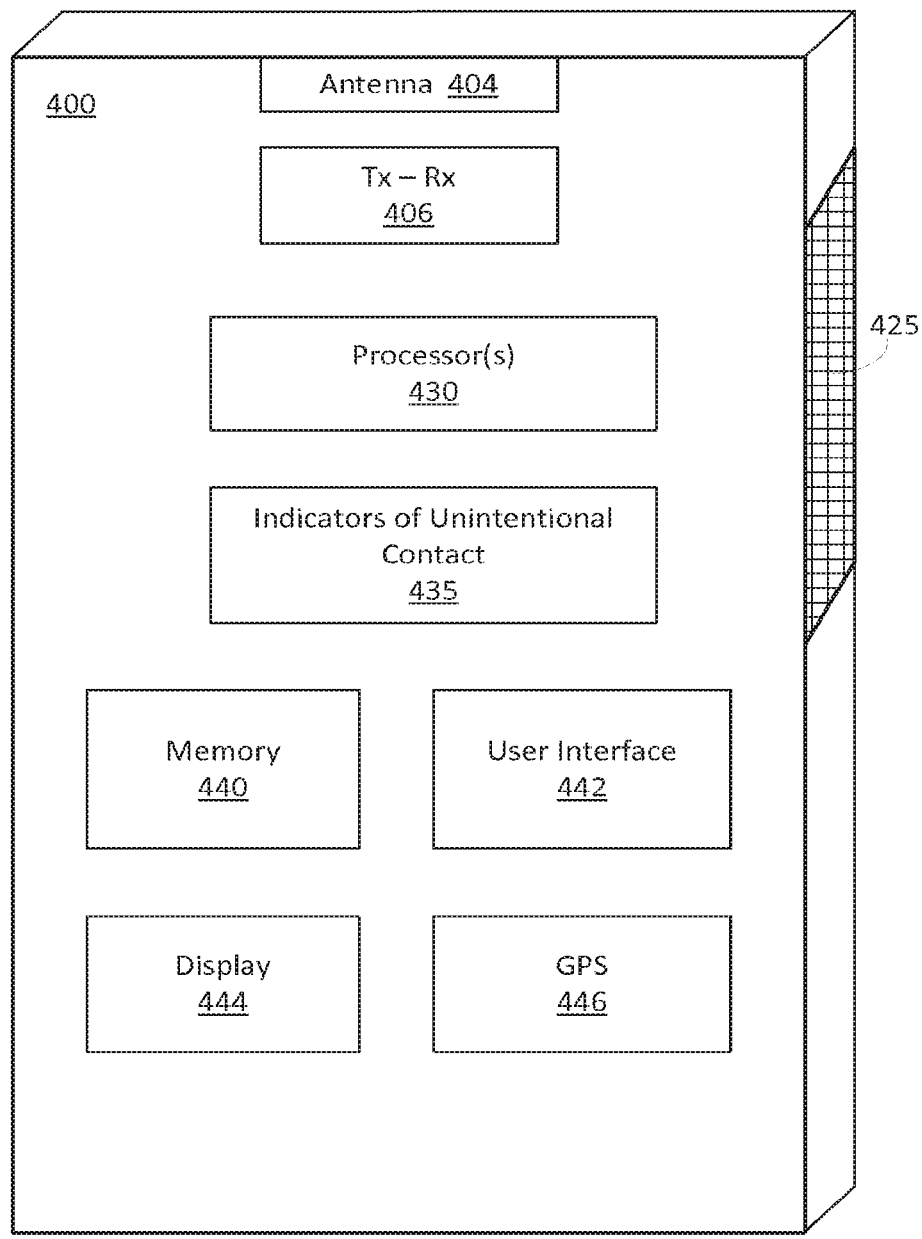
FIG. 4 is an illustration of an embodiment of elements of a mobile device that provides rejection of unintentional contact to touch sensors.

FIG. 4 is an illustration of an embodiment of elements of a mobile device that provides rejection of unintentional contact to touch sensors. In some embodiments, the mobile device 400 includes aside touch sensor 425 for use in providing input to the mobile device through gesture operations of a thumb or other finger of the user. In some embodiments, the mobile device 400 further includes one or more processors 430 for the processing of signals and commands, including inputs received from the side touch sensor.

In some embodiments, the mobile device 400 includes a control module or algorithm 435 to reject inadvertent contacts to the side touch sensor 425. In some embodiments, the mobile device collects data generated by the side touch sensor 425 from contact to such sensor, and performs statistical analysis for such contact over a time period. In some embodiments, the statistical analysis includes but is not limited to:

(1) Determination of the size of a contact point, where, for example, a large contact point may be an indicator of a hand of a user being wrapped around the mobile device 400 and making inadvertent contact with the side touch sensor 425;

(2) Determination of the motion of a contact point, where, for example, the lack of motion of certain contact points may be an indicator that the hand of the user is in a rest position and contact with the side touch sensor 425 is being used to support the mobile device;

(3) Determination of the shape of the contact point on the side touch sensor 425, where, for example, a shape may be an indicator of a hand wrapped around the mobile device 400; and (4) Determination of the number of contact points on the side touch sensor 425, where, for example, a second contact point on a lower portion of the side touch sensor 425 below a first contact point may be an indicator of inadvertent contact with the side touch sensor when providing input to the mobile device 400.

The mobile device may further include, for example, one or more transmitters and receivers 406 for the wireless transmission and reception of data, as well as one or more antennas 404 for such data transmission and reception; a memory 440 for the storage of data; a user interface 442, including a graphical user interface (GUI), for communications between the mobile device 400 and a user of the device; a display circuit or controller 444 for providing a visual display to a user of the mobile device 400; and a location circuit or element, including a (GPS) circuit or element 446.

Figure 5:
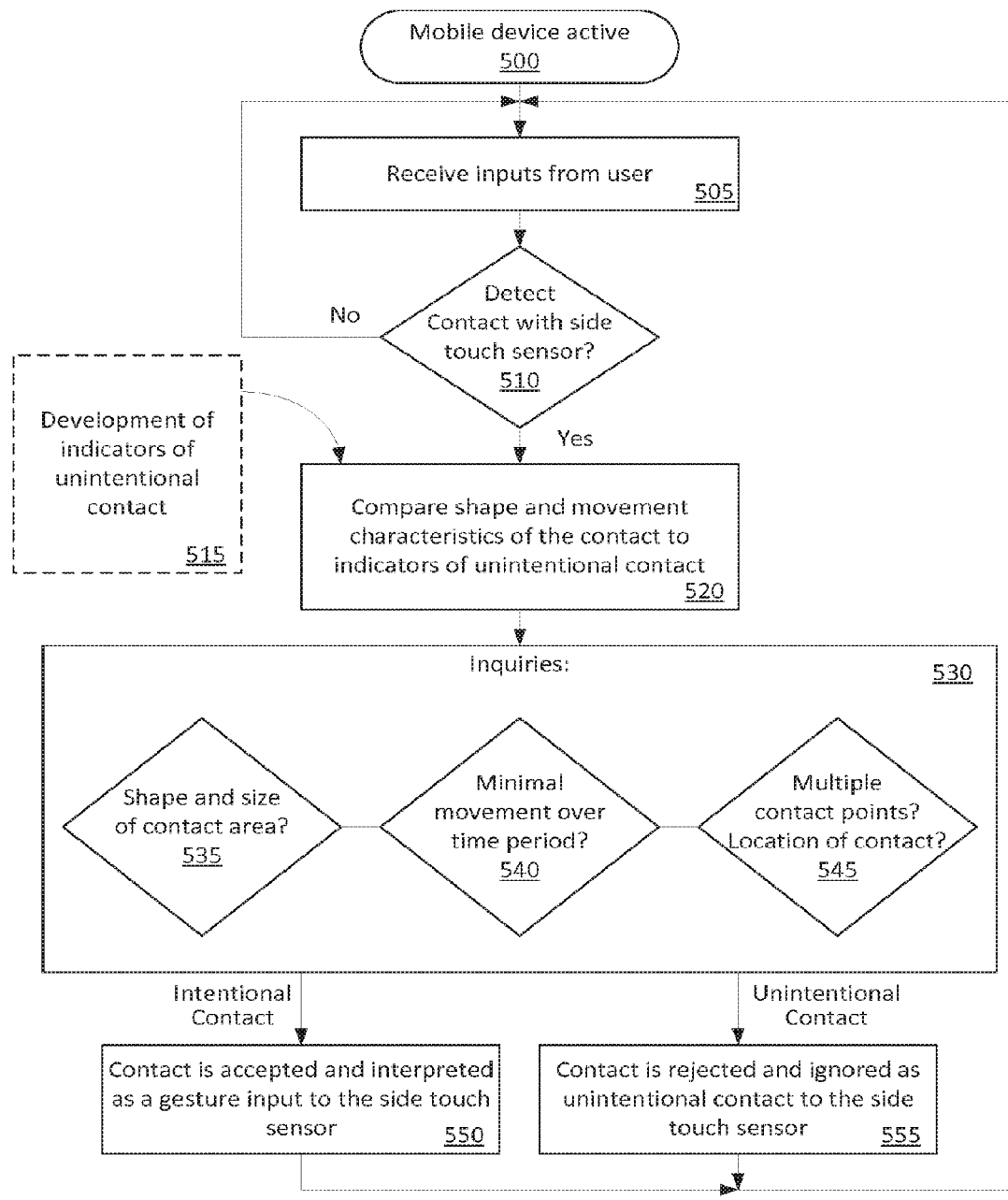
FIG. 5 is a flowchart to illustrate an embodiment of a process for transforming sensor data to represent user intent and perception based on contact area.

FIG. 5 is a flowchart to illustrate an embodiment of a process for transforming sensor data to represent user intent and perception based on contact area. In some embodiments, upon a mobile device becoming operational 500, the mobile device may proceed with normal operations, including receipt of sensor inputs 505. In some embodiments, the sensor inputs include input from a side touch sensor.

In some embodiments, indicators of unintentional contact with the side touch sensor have been developed 515, which may include empirical development of such indicators based on usage of mobile devices. In some embodiments, if the mobile device detects contact with the side touch sensor 510, there is a comparison of shape and movement characteristics to the indicators of unintentional contact 520.

In some embodiments, inquiries 530 to determine how the contact with the side touch sensor compares with indicators of unintentional contact are made, including, but not limited to, the following:

The shape and size of the contact area 535, such as a large contact area that appears to be in the shape of a hand wrapping around the mobile device;

Minimal movement of the contact area 540, such as indicating a hand holding the mobile device in a resting position; and Whether there are multiple contact points 545, such as indicating that there is first contact point that is providing input to the mobile device and a second contact, such as a contact point on a lower portion of the side touch sensor, that is indicative of a part of the hand of the user supporting the mobile device while performing gestures with the thumb or other finger of the user's hand.

In some embodiments, if the comparison of the sensor contact with the indicators of unintentional contact with the side touch sensor results in a conclusion that the contact is intentional, then the contact is accepted and interpreted as a gesture input to the side touch sensor 550. If the comparison of the sensor contact with the indicators of unintentional contact with the side touch sensor results in a conclusion that the contact is unintentional, then the contact is ignored as unintentional contact to the side touch sensor and there is no input to the mobile device 555.

Figure 6:
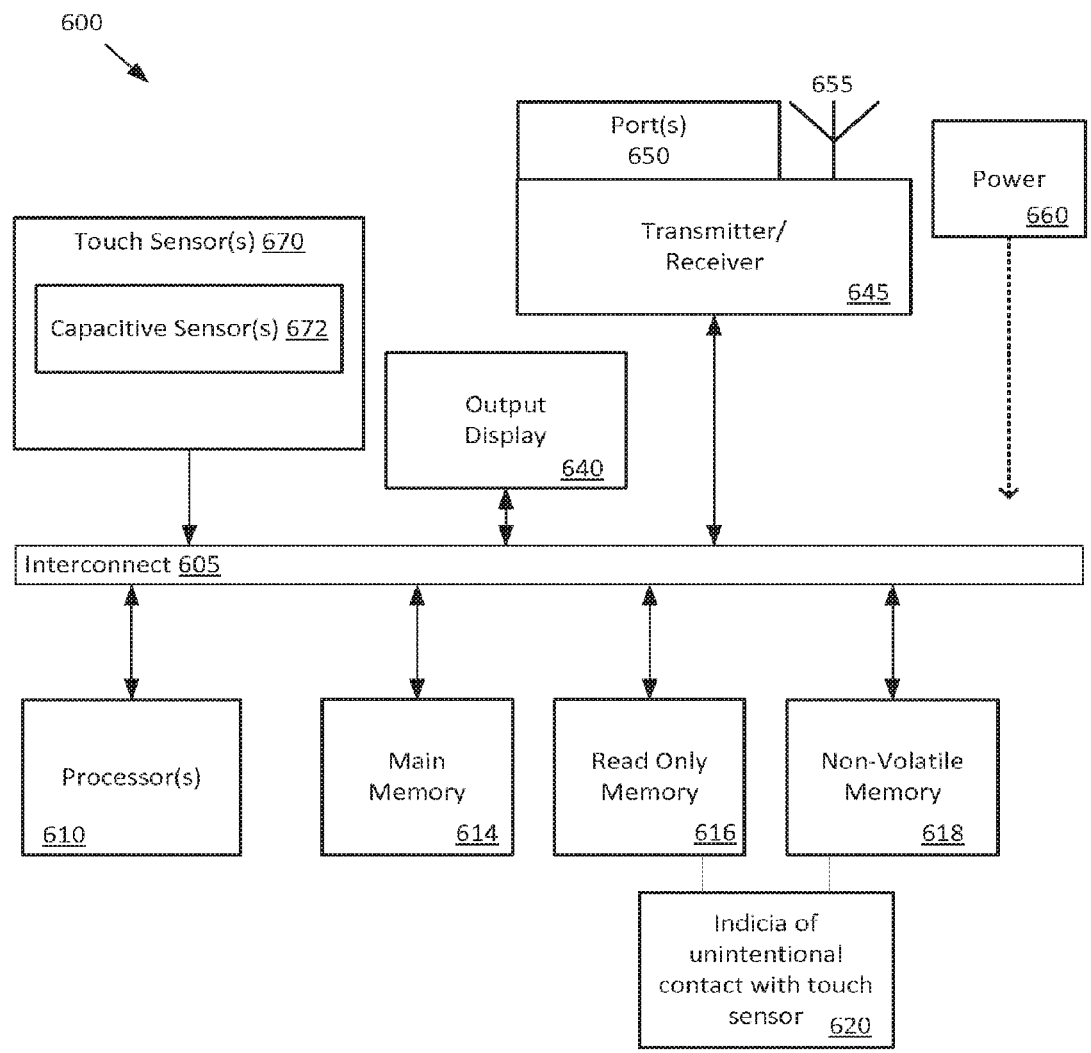
FIG. 6 illustrates an embodiment of a mobile device providing rejection of unintentional contact to touch sensors.

FIG. 6 illustrates an embodiment of a mobile device providing rejection of unintentional contact to touch sensors. In this illustration, certain standard and well-known components that are not germane to the present description are not shown. Under some embodiments, the mobile device 600 comprises an interconnect or crossbar 605 or other communication means for transmission of data. The device 600 may include a processing means such as one or more processors 610 coupled with the interconnect 605 for processing information. The processors 610 may comprise one or more physical processors and one or more logical processors. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers.

In some embodiments, the device 600 includes one or more touch sensors 670. In some embodiments, the touch sensors 670 may includes capacitive sensors 672, and may include a side touch sensor, such as side touch sensor 425 as illustrated in FIG. 4. In some embodiments, the device 600 provides for rejection of unintentional contact to the side touch sensor based on analysis of the contact area, including analysis of, for example, the size, shape, and motion of the contact area, and the number of contact areas present.

In some embodiments, the device 600 further comprises a random access memory (RAM) or other dynamic storage device or element as a main memory 614 for storing information and instructions to be executed by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The device 600 also may comprise a read only memory (ROM) 616 or other static storage device for storing static information and instructions for the processors 610. The device 600 may include one or more non-volatile memory elements 618, including flash memory, for the storage of certain elements. In some embodiments, the ROM memory 616 or the non-volatile memory 618 may include storage of data regarding indicia of unintentional contact 620 for use in rejecting contact with a touch sensor that is determined to be unintentional contact by a user of the device 600.

The device 600 may also be coupled via the interconnect 605 to an output display 640. In some embodiments, the display 640 may include a liquid crystal display (LCD) or any other display technology, for displaying information or content to a user. In some environments, the display 640 may include a touch-screen that is also utilized as at least a part of an input device. In some environments, the display 640 may be or may include an audio device, such as a speaker for providing audio information.

One or more transmitters or receivers 645 may also be coupled to the interconnect 605. In some embodiments, the device 600 may include one or more ports 650 for the reception or transmission of data. The device 600 may further include one or more antennas 655 for the reception of data via radio signals.

The device 600 may also comprise a power device or system 660, which may comprise a power supply, a battery, a solar cell, a fuel cell, or other system or device for providing or generating power. The power provided by the power device or system 660 may be distributed as required to elements of the device 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a non-transitory computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may". "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computing device capable of being used in distinguishing between intentional touch contacts and unintentional contacts, the computing device comprising:
    a touch screen located on a top side of the computing device;
    a side touch sensor located on a side of the computing device different from the top side;
    a processor; and
    storage capable of storing instructions to be executed by the processor, the instructions when executed by the processor being capable of resulting in performance of operations comprising:
    detection, by the side touch sensor, of a touch of a user;
    analyzing of data relating to the touch detected by the side touch sensor to determine whether the touch is intentional or unintentional, wherein analyzing includes comparing the data relating to the touch to a plurality of indicators obtained over a period of time;
    acceptance of the touch, if one or more indicators of the plurality of indicators identify the touch to be intentional; and
    rejection of the touch, if one or more indicators identify the touch to be unintentional.

2. The computing device of claim 1, wherein the side touch sensor is further to detect simultaneous multiple touches of the user, wherein at least a first touch of the multiple touches is identified as intentional, and wherein at least a second touch of the multiple touches is identified as unintentional, wherein the second touch is identified as being unintentional for having potential for causing disruption in usage experience of the user.

3. The computing device of claim 1, wherein the acceptance of the touch detected by the side touch sensor comprises responding to an input associated with the touch, wherein the rejection of the touch comprises ignoring of the input associated with the touch, and wherein the data includes the input, wherein the data comprises at least one of size of the touch, shape of the touch, motion of the touch, or contact points relating to the touch.

4. The computing device of claim 3, wherein the touch detected by the side touch sensor is unintentional if the size, when comparing with one or more indicators, indicates the touch being facilitated by a hand or a palm of the user.

5. The computing device of claim 3, wherein the touch detected by the side touch sensor is unintentional if the shape, when comparing with the one or more indicators, indicates the touch being facilitated by a hand or a palm of the user.

6. The computing device of claim 3, wherein the touch detected by the side touch sensor is unintentional if the motion, when comparing with one or more indicators, indicates the touch being facilitated by a resting hand or a resting palm of the user.

7. The computing device of claim 3, wherein the touch detected by the side touch sensor is unintentional if the contact points, when comparing with the one or more indicators, indicate the touch being made in one or more non-contact areas near the touch sensor.

8. A method for distinguishing between intentional touch contacts and unintentional touch contacts, the method comprising:
    detecting, by a side touch sensor located on a side of a computing device and different from a top side of the computing device, a touch of a user;
    analyzing data relating to the touch detected by the side touch sensor to determine whether the touch is intentional or unintentional, wherein analyzing includes comparing the data relating to the touch to a plurality of indicators obtained over a period of time;
    accepting the touch, if one or more indicators of the plurality of indicators identify the touch to be intentional; and
    rejecting the touch, if the one or more indicators identify the touch to be unintentional.

9. The method of claim 8, further comprising detecting, by the side touch sensor, simultaneous multiple touches of the user, wherein at least a first touch of the multiple touches is identified as intentional, and wherein at least a second touch of the multiple touches is identified as unintentional, wherein the second touch is identified as being unintentional for having potential for causing disruption in usage experience of the user.

10. The method of claim 8, wherein accepting the touch detected by the side touch sensor comprises responding to an input associated with the touch, wherein rejecting the touch comprises ignoring the input associated with the touch, wherein rejecting the touch comprises ignoring the input associated with the touch, and wherein the data includes input, wherein the data comprises at least one of size of the touch, shape of the touch, motion of the touch, or contact points relating to the touch.

11. The method of claim 10, wherein the touch detected by the side touch sensor is unintentional if the size when comparing with the one or more indicators, indicates the touch being facilitated by a hand or a palm of the user.

12. The method of claim 10, wherein the touch detected by the side touch sensor is unintentional if the shape, when comparing with the one or more indicators, indicates the touch being facilitated by a hand or a palm of the user.

13. The method of claim 10, wherein the touch detected by the side touch sensor is unintentional if the motion, when comparing with the one or more indicators, indicates the touch being facilitated by a resting hand or a resting palm of the user.

14. The method of claim 10, wherein the touch detected by the side touch sensor is unintentional if the contact points, when comparing with the one or more indicators, indicate the touch being made in one or more non-contact areas near the touch sensor.

15. A machine-readable medium comprising instructions which, when executed by a computing device, cause the computing device to perform operations comprising:
    detecting, by a side touch sensor located on a side of the computing device different from a top side of the computing device, a touch of a user;
    analyzing data relating to the touch detected by the side touch sensor to determine whether the touch is intentional or unintentional, wherein analyzing includes comparing the data relating to the touch to a plurality of indicators obtained over a period of time;
    accepting the touch, if one or more indicators of the plurality of indicators identify the touch to be intentional; and
    rejecting the touch, if one or more indicators identify the touch to be unintentional.

16. The machine-readable medium of claim 15, wherein the operations further comprise detecting, by the side touch sensor, simultaneous multiple touches of the user, wherein at least a first touch of the multiple touches is identified as intentional, and wherein at least a second touch of the multiple touches is identified as unintentional, wherein the second touch is identified as being unintentional for having potential for causing disruption in usage experience of the user.

17. The machine-readable medium of claim 15, wherein accepting the touch detected by the side touch sensor comprises responding to an input associated with the touch, wherein rejecting the touch comprises ignoring the input associated with the touch, and wherein the data includes input, wherein the data comprises at least one of size of the touch, shape of the touch, motion of the touch, or contact points relating to the touch.

18. The machine-readable medium of claim 17, wherein the touch detected by the side touch sensor is unintentional if the size, when comparing with the one or more indicators, indicates the touch being facilitated by a hand or a palm of the user.

19. The machine-readable medium of claim 17, wherein the touch detected by the side touch sensor is unintentional if the shape, when comparing with the one or more indicators, indicates the touch being facilitated by a hand or a palm of the user.

20. The machine-readable medium of claim 17, wherein the touch detected by the side touch sensor is unintentional if the motion, when comparing with the one or more indicators, indicates the touch being facilitated by a resting hand or a resting palm of the user,
    wherein the touch is unintentional if the contact points, when comparing with the one or more indicators, indicate the touch being made in one or more non-contact areas near the touch sensor.

* * * * *